Aug. 9, 1966   R. JAHN   3,265,449
BALL BEARINGS

Filed March 7, 1962   3 Sheets-Sheet 1

Aug. 9, 1966  R. JAHN  3,265,449
BALL BEARINGS

Filed March 7, 1962  3 Sheets-Sheet 2

Aug. 9, 1966  R. JAHN  3,265,449
BALL BEARINGS

Filed March 7, 1962

United States Patent Office 3,265,449
Patented August 9, 1966

3,265,449
BALL BEARINGS
Rudolf Jahn, Herzogenaurach, near Nurnberg, Germany, assignor to Industriewerke Schaeffler OHG, Herzogenaurach, near Nurnberg, Germany, a company of Germany
Filed Mar. 7, 1962, Ser. No. 178,013
Claims priority, application Germany, Mar. 10, 1961, J 19,570
4 Claims. (Cl. 308—6)

The invention relates to a ball bearing for longitudinal movements, which comprises a plurality of tubular elements situated concentrically one within the other without spacing therebetween, and wherein the balls move in self-contained guides distributed over the periphery, and are subjected to load only over part of their path of circulation, the balls being lifted as they pass from the loaded to the unloaded zone and lowered as they pass from the unloaded to the loaded zone.

The known ball bearings for longitudinal movements have disadvantages which reside more particularly in their uneconomical method of manufacture. A bearing comprising two tubular metal elements having thick walls and situated one within the other comprises oval grooves of varying depth both in the inner and also in the outer tubular element in order to form the self-contained ball guideways. In the inner tubular element, these grooves are provided in the region where the balls are under load, with additional openings through which the balls come into direct contact with the shaft. Following these openings, the balls are lifted from their supporting track by elevations or depressions formed in the grooves, thus permitting return of the balls to the oval track groove formed in the outer tubular element from the inside of the said element, the said groove constituting together with the groove formed in the outer tubular element the closed guideway for the balls. It is extremely difficult to form these ball guideways in the two tubular elements, but particularly in the outer element, since in addition to achieving a uniform incline and descent along the grooves, the bearing surfaces must also be smooth in order to avoid faults. A further disadvantage of the known bearing consists in that the grooves formed in the two tubular elements are not visible from the outside, so that at the time of assembly they cannot be made to register with one another with the necessary precision, with the result that the tracks do not come exactly into alignment and consequently the balls circulating in the ball guideways are hindered in their running.

The object of the invention is to provide a ball bearing for longitudinal movements whose parts can be manufactured in a particularly economical manner and in a very simple way, and wherein the outer tubular element does not have any grooves formed in it. Moreover, the two tubular elements must be adapted to be assembled satisfactorily and reliably, and the ball guideways of the inner tubular element must coincide accurately, and in such a manner as to permit easy supervision, with the openings in the outer tubular element. Finally, the ball guideways and tracks are to be smooth.

According to the invention this is achieved by the combination of an inner tubular element which is provided with slots and elevations for the balls and whose outer diameter is outside the centres of the returning balls, in conjunction with an outer, relatively thin, conveniently metallic and smooth tubular element which is so provided with through slots which coincide with the ball guides of the inner tubular element that the returning ball rows are secured against falling out.

Advantageously, the inner tubular element, provided with slots and elevations for the gall guides, is produced by casting, pressing, stamping, injection moulding or the like, with simultaneous formation of the requisite openings, grooves, retaining noses and the like. This enables the inner tubular element to be produced in the most economical manner and with the necessary precision and track smoothness in a single working operation, and at the same time to achieve the necessary high quality for satisfactory operation.

Conveniently, the outer, thin, smooth tubular element consists of a particularly pressure-resistant material, e.g. a surface-hardened sheet steel, whose slots are expediently kept narrower than the ball diameter and which are stamped out with very great precision and in a very simple way, whilst the inner, thick-walled and less highly stressed tubular element consists of a readily mouldable material, e.g. synthetic plastic material, sintered material, pressure-casting aluminum, or the like. In the bearing according to the invention, the most suitable material in each case can be used for each tubular element in accordance with the function which it fulfills. Only the outer, thin-walled tubular element must have the necessary hardness in order to obtain the maximum load-bearing capacity, and the inner thick-walled tubular element, which is not subjected to any stresses, can consist of a material which can be molded very easily and whose quality is merely adapted to the necessary guiding properties expected of this part.

According to the invention, the inner tubular element can consist of a plurality of part-segments which are produced individually and which are assembled together to form a ring when the bearing is assembled. For easier manufacture and in order to avoid high tool costs, the part segments are conveniently identical to one another.

In order to avoid the formation of linear indentations, according to the invention the through slots of the inner tubular element can be inclined at up to 15° relatively to the bearing axis. The balls then roll on the oscillating shaft along a relatively broad, strip-like surface area. The size of the inclination depends on the materials which are used, and more particularly on their resistance to pressure and abrasion.

In order to protect the bearings against fouling from the exterior, whether the bearing is in the mounted or non-mounted state, the through slots in the outer tubular element are protected from the outside by a smooth envelope or the like which is arranged on the said outer element. A covering of this kind can be executed in various forms, for example, in the form of a sleeve, a synthetic plastic material covering, or the like. On the other hand, it is also possible to insert the necessary covering in the bore in which the ball bearing is to be inserted.

The invention is illustrated by way of example in the drawings wherein.

Figure 1:
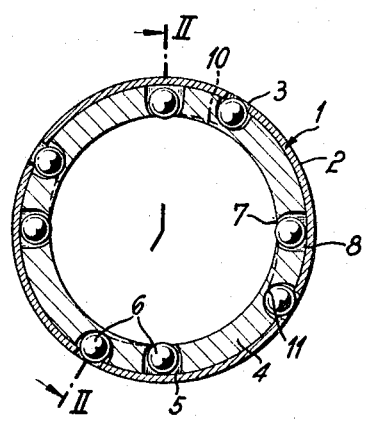
FIGURE 1 is a cross-section through a ball bearing for longitudinal movements.
Figure 3:
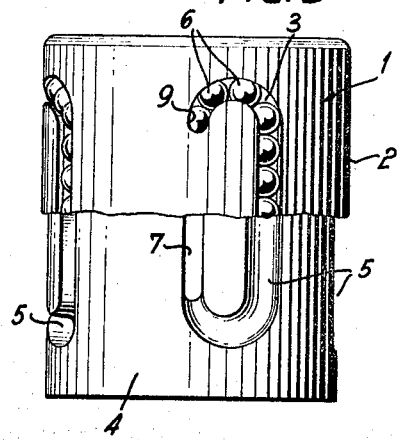
Figure 4:
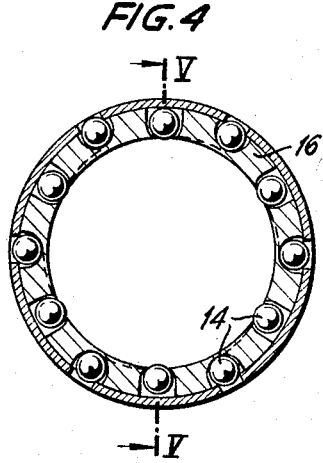
Figure 5:
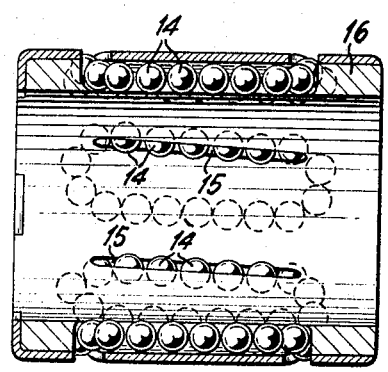
Figure 6:
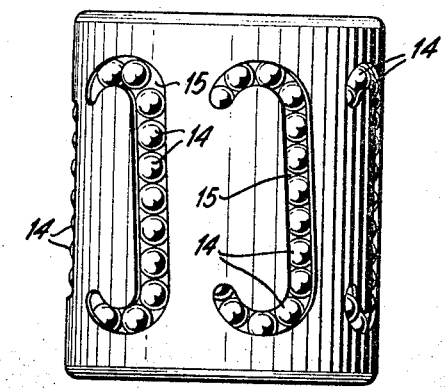
Figure 7:
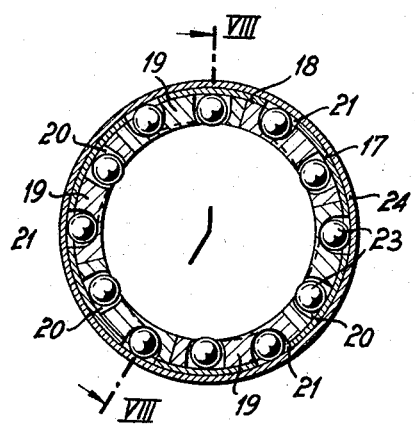
Figure 8:
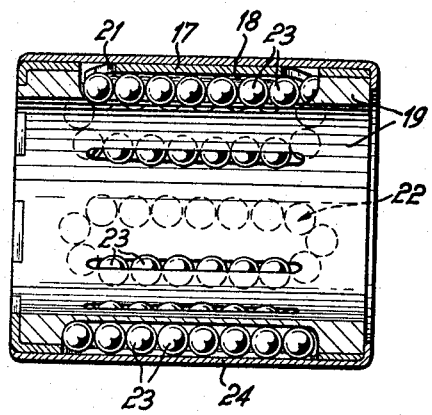

FIGURE 3 shows in its upper half a bearing according to FIGURE 1 in elevational view and in its lower half shows an elevational view of the inner tubular element, FIGURE 4 is a cross-sectional view of a ball bearing for longitudinal movements, in a modified form of embodiment, FIGURE 5 is a longitudinal sectional view taken on the line V—V of FIGURE 4, FIGURE 6 is an elevational view of the bearing according to FIGURE 4, FIGURE 7 is a cross-sectional view through a further modified form of embodiment of the ball bearing for longitudinal movements, FIGURE 8 is a longitudinal sectional view taken on the line VIII—VIII of FIGURE 7.

Figure 2:
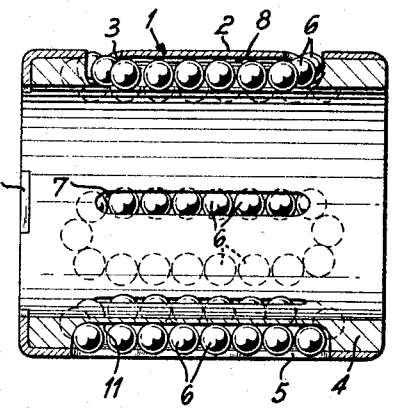
FIGURE 2 is a longitudinal sectional view taken on the line II—II of FIGURE 1.

The ball bearing for longitudinal movements which is shown in FIGURES 1 to 3 comprises an outer tubular element 1 having a smooth cylindrical periphery 2, in which C-shaped slots 3 extending in the axial direction are formed. Situated within this tubular element 1, without any spacing therebetween, is a thick-walled tubular element 4 having the same number of oval grooves 5. The wall thickness of this inner tubular element 4 is less than the diameter of the balls 6 situated in these grooves 5. The grooves 5 coincide with the slots 3. In the regions where the C-shaped slots 3 terminate, the grooves 5 are taken right through the inner element to constitute a slot 7, so that in these regions the balls can bear against the shaft raceway. The outer raceway 8 for the balls 6 is formed by the inner surface of the outer tubular element 1. The slots 7 which guide the balls 6 which are under load, are longer than the mutual spacing of the slot ends 9, in order that the balls 6 can rise from the shaft raceway on elevations 10 in the groove 5, to be returned again to the shaft raceway after completing the circuit. The balls 6 return along the groove 5 outside the slots 7 without being subjected to load, since the spacing between the groove bottom 11 and the periphery 2 is greater than the ball diameter. Conveniently, the width of the slots 3 is less than the ball diameter, so that in the non-mounted state the balls 6 are retained thereby. The outer tubular element 1 is provided at one end with one or more inwardly directed noses 12 which engage in corresponding recesses 13 in the inner tubular element 4 and secure the two elements against rotation relatively to one another. The two tubular elements 1 and 4 are fixed against moving relatively to one another in the axial direction in a manner known per se, e.g. by using an interference fit. The outer, thin-walled tubular element 1 in the illustrated embodiment consists of a drawn and hardened metal sleeve, whilst the inner tubular element 4, whose outer diameter is situated outside the centres of the returning balls 6, is made of synthetic plastic material.

FIGURES 4 to 6 show a modified form of embodiment of the subject of the invention. The bearing is provided with a plurality of self-contained ball rows 14 which, however, are inclined relatively to the axial direction so that when axial movement takes place between bearing and shaft the balls 14 roll on a wide, strip-like surface of the shaft. In accordance with the inclination of the slots 15, the inner tubular element 16 requires to be made of a material which has good sliding properties as well as good resistance to pressure and abrasion.

The example of embodiment which is illustrated in FIGURES 7 and 8 and constitutes a further variant, consists of an outer tubular element 17 which accepts the load and of segments 19 which are inserted in the bore 18 of the said tubular element 17 and together constitute a ring and in which are formed one or more encircling grooves 20. As already illustrated in FIGURES 1 to 3, the outer tubular element 17 has C-shaped slots 21 so that the balls 23 in the self-contained tracks 22 are situated in such a manner that they bear closely against one another. In order that no impurities can enter from the outside during the return of the balls 23, or when the bearing is not mounted, the outer tubular element 17 is further covered by a sleeve 24. Since the balls 23 are not retained by the slots 21 but by the sleeve 24, the width of the slots 21 in this case can be optional.

I claim:
1. Ball bearing for longitudinal movements, comprising at least an inner tubular element and an outer tubular element engaged concentrically without spacing therebetween to provide together several closed-loop guides, balls under load only on part of their path of circulation, the portions of the guides of the inner tubular element each comprising two straight sections connected by two semicircular arcs, one part of the guides in said inner tubular element having a wall thickness slightly less than the ball diameter and covered outwardly by said outer tubular element, said one part of the guides in the inner tubular element having along one of the straight sections an inwardly open slot, the width thereof being inferior to the ball diameter, the outer tubular element providing the ball raceway along this section, along the other straight section and the two semicircular arcs, the outer tubular element having through slots forming the other part of said guides, the width thereof being inferior to the ball diameter to secure them against falling out and said balls being contained in the straight sections connected by two semicircular arcs, the outer tubular element being relative to the inner member thin-walled and is made of a particularly pressure-resistant material, as surface-hardened sheet steel, and the inner tubular element being relative to the outer member thick-walled, only slightly stressed and made of a readily mouldable material.

2. Ball bearing for longitudinal movements according to claim 1, characterised in that the inner tubular element consists of a plurality of part-segments which are produced individually and are assembled together to form a ring, when the bearing is assembled.

3. Ball bearing for longitudinal movements according to claim 1, characterised in that the part-segments are identical to one another.

4. Ball bearing for longitudinal movements according to claim 1, characterised in that the slots of the inner tubular element are through slots and are arranged at an inclination of up to 15° relatively to the bearing axis.

References Cited by the Examiner

UNITED STATES PATENTS

| | | | |
|---|---|---|---|
| 1,915,287 | 6/1933 | Bolt | 308—201 |
| 2,503,009 | 4/1950 | Thomson | 308—6 |
| 2,509,749 | 5/1950 | Thomson | 308—6 |
| 2,569,531 | 10/1951 | Kunzog | 308—6 |
| 2,576,269 | 11/1951 | Thomson | 308—6 |
| 2,628,135 | 2/1953 | Magee | 308—6 |
| 2,911,268 | 11/1959 | Staunt | 308—201 |
| 2,981,569 | 4/1961 | Danly | 308—6 |
| 3,037,821 | 6/1962 | Schutz | 308—6 |
| 3,042,459 | 7/1962 | Magg | 308—6 |
| 3,045,457 | 7/1962 | Blanchard. | |

FOREIGN PATENTS

| | | |
|---|---|---|
| 755,957 | 12/1933 | France. |
| 696,448 | 9/1953 | Great Britain. |

DAVID J. WILLIAMOWSKY, *Primary Examiner.*

MILTON KAUFMAN, ROBERT C. RIORDON, DON A. WAITE, *Examiners.*

L. L. JOHNSON, *Assistant Examiner.*